US009661355B2

(12) United States Patent
Ho

(10) Patent No.: US 9,661,355 B2

(45) Date of Patent: May 23, 2017

(54) VIRTUAL IMMERSION VIA STREAMED CONTENT ADAPTATION

(71) Applicant: Kiswe Mobile Inc., Bethesda, MD (US)

(72) Inventor: Yung-Lung Ho, Bethesda, MD (US)

(73) Assignee: Kiswe Mobile Inc., Bethesda, MD (US)

( * ) Notice: Subject to any disclaimer, the term of this patent is extended or adjusted under 35 U.S.C. 154(b) by 154 days.

(21) Appl. No.: 14/699,515

(22) Filed: Apr. 29, 2015

(65) Prior Publication Data

US 2016/0205418 A1 Jul. 14, 2016

Related U.S. Application Data

(60) Provisional application No. 62/101,073, filed on Jan. 8, 2015.

(51) Int. Cl.

*H04N 21/218* (2011.01)

*A63B 24/00* (2006.01)

(Continued)

(52) U.S. Cl.

CPC ... *H04N 21/21805* (2013.01); *A63B 24/0062* (2013.01); *G06F 17/3084* (2013.01);

(Continued)

(58) Field of Classification Search

USPC ....... 188/20; 375/240.01; 386/223; 455/418; 700/91, 94; 715/744; 709/203, 206, 217, (Continued)

(56) References Cited

U.S. PATENT DOCUMENTS 6,152,476 A * 11/2000 Huang ...................... B62B 7/08 188/20

6,244,988 B1 6/2001 Delman (Continued)

FOREIGN PATENT DOCUMENTS

WO PCT/US2015/066135 2/2016

OTHER PUBLICATIONS

Expressopocalypse, "The Interactive Experience," http://expresso.com/Learn/Experience, 2015, 4 pages.

(Continued)

*Primary Examiner* — Quang N Nguyen

(74) *Attorney, Agent, or Firm* — Ryan, Mason & Lewis, LLP

(57) ABSTRACT

A method comprises obtaining information characterizing multiple content streams comprising respective portions of content received from respective ones of a plurality of sources, obtaining positional information for the sources wherein the positional information indicates for each of the sources its current position in a set of possible positions relative to other ones of the sources, generating an additional content stream comprising selected portions of particular ones of the multiple content streams based at least in part on the positional information and a mapping between the content streams and the sources, and presenting the additional content stream to a user. The additional content stream may be generated so as to provide the user with a dynamic vantage point within a live event by switching between the selected portions of the particular ones of the multiple content streams, possibly as a function of input received from user equipment operated by the user.

25 Claims, 3 Drawing Sheets

100 106 DISTRIBUTED WEB SERVERS 108-1 116 107 114 VIDEO SEGMENT VIDEO SEGMENT VIDEO SEGMENT 108-M STANDARD DATA LINK VIDEO SEGMENTS SEGMENT REQUEST 110 112 INITIAL MASTER PLAYLIST CLIENT CONSOLE 105A HTTP 105 104 VIDEO SERVER 125 102 120-1 ENCODER/ ENCODER/ ENCODER/ SEGMENTER MEDIA CONTROL CENTER ENCODER/ SEGMENTER 120-M 152 150 130 140 142 132

(51) Int. Cl.

| | |
|---|---|
| ***H04N 21/2187*** | (2011.01) |
| ***H04N 21/236*** | (2011.01) |
| ***H04N 21/2665*** | (2011.01) |
| ***H04N 21/4223*** | (2011.01) |
| ***H04N 21/462*** | (2011.01) |
| ***H04N 21/61*** | (2011.01) |
| ***G06F 17/30*** | (2006.01) |

(52) U.S. Cl.

CPC .. *G06F 17/30516* (2013.01); *G06F 17/30781* (2013.01); *G06F 17/30855* (2013.01); *H04N 21/2187* (2013.01); *H04N 21/23614* (2013.01); *H04N 21/2665* (2013.01); *H04N 21/4223* (2013.01); *H04N 21/4622* (2013.01); *H04N 21/6125* (2013.01)

(58) Field of Classification Search

USPC ....... 709/219, 223, 224, 226, 228, 231, 232, 709/238

See application file for complete search history.

(56) References Cited

U.S. PATENT DOCUMENTS

| | | | | |
|---|---|---|---|---|
| 7,465,257 | B1 | 12/2008 | Morgan, Jr. | |
| 7,497,807 | B2 | 3/2009 | Neff et al. | |
| 7,575,518 | B2 * | 8/2009 | Tabata | A63F 13/005 3/5 |
| 7,811,200 | B2 | 10/2010 | Chiang | |
| 8,029,415 | B2 | 10/2011 | Ashby et al. | |
| 2006/0122035 | A1 | 6/2006 | Felix | |
| 2010/0022354 | A1 | 1/2010 | Fisher | |
| 2012/0245721 | A1 * | 9/2012 | Story, Jr. | G06F 3/04842 700/94 |
| 2013/0039632 | A1 * | 2/2013 | Feinson | H04N 5/77 386/223 |
| 2013/0066448 | A1 * | 3/2013 | Alonso | H04Q 9/00 700/91 |
| 2013/0274069 | A1 | 10/2013 | Watterson et al. | |
| 2014/0089990 | A1 | 3/2014 | van Deventer et al. | |
| 2014/0177700 | A1 * | 6/2014 | Schmidt | H04N 19/00472 375/240.01 |
| 2014/0274564 | A1 | 9/2014 | Greenbaum | |
| 2015/0113426 | A1 * | 4/2015 | Okubo | G08B 21/10 715/744 |

OTHER PUBLICATIONS

IFIT.COM, “Get Your Best Body Right at Home,” https://www.ifit.com/premium, 2015, 7 pages.

ICONFITNESS.COM, “Running Partners: Boston Marathon and Pro-Form Fitness Announce Partnership to Create Runner’s Treadmill,” Innovations: ICON Health & Fitness, https://www.iconfitness.com/innovations.html, Jun. 28, 2012, 2 pages.

EXPRESSO.COM, “The Interactive Experience,” http://expresso.com/Learn/Experience, 2014, 4 pages.

* cited by examiner

VIRTUAL IMMERSION VIA STREAMED CONTENT ADAPTATION

PRIORITY CLAIM

This application claims priority to U.S. Provisional Patent Application Ser. No. 62/101,073, filed Jan. 8, 2015 and entitled "Faux Racing via Streamed Video Adaptation," which is incorporated by reference herein in its entirety.

FIELD

The field relates generally to live video and other types of media content, and more particularly to processing of media content.

BACKGROUND

The rapidly growing use of mobile devices such as laptops, tablets and cellphones has greatly diversified the modes of media consumption. Despite recent advances in this area, a need remains for improved techniques for user interaction with live video and other types of media content.

SUMMARY

Illustrative embodiments of the invention significantly enhance user interaction with live video and other types of media content. By way of example only, this is done in some embodiments by providing the user with functionality for faux racing via streamed video adaptation. Such an arrangement is an example of what is more generally referred to herein as "virtual immersion." Numerous alternative applications other than faux racing can be supported using the disclosed techniques.

In one embodiment, a method comprises obtaining information characterizing multiple content streams comprising respective portions of content received from respective ones of a plurality of sources, obtaining positional information for the sources wherein the positional information indicates for each of the sources its current position in a set of possible positions relative to other ones of the sources, generating an additional content stream comprising selected portions of particular ones of the multiple content streams based at least in part on the positional information and a mapping between the content streams and the sources, and presenting the additional content stream to a user. The method in this embodiment is illustratively implemented by a client device or other arrangement of one or more processing devices.

The additional content stream may be generated so as to provide the user with a dynamic vantage point within a live event by switching between the selected portions of the particular ones of the multiple content streams, possibly as a function of input received from user equipment operated by the user. For example, the user equipment may comprise exercise equipment and the input received from the user equipment may comprise a velocity indicator generated as the user operates the exercise equipment.

In another embodiment, a method comprises receiving content from a plurality of sources, generating positional information for the sources wherein the positional information indicates for each of the sources its current position in a set of possible positions relative to other ones of the sources, generating multiple content streams comprising respective portions of the content received from respective ones of the sources based at least in part on the positional information and a mapping between the content streams and the sources, and transmitting the content streams with their associated positional information over a network. Responsive to detection of a change in position of at least a given one of the sources relative to other ones of the sources, the mapping between the multiple content streams and the sources is altered, and at least a subset of the receiving content, generating positional information, generating multiple content streams and transmitting the content streams are repeated utilizing the altered mapping. The method in this embodiment is illustratively implemented by a media control center coupled to a video server, although other arrangements of one or more processing devices could be used to implement the method.

At least a subset of the plurality of sources may each comprise a participant-mounted wireless video camera having location determination functionality that is utilized in generating a corresponding portion of the positional information. For example, at least a subset of the plurality of sources may comprise respective live video sources associated with respective actual participants in a live event.

The above-noted faux racing embodiment may be viewed as an example of an arrangement in which the live event comprises a race and the actual participants comprise actual participants in the race, with the positional information indicating current positions of the actual participants in the race. For example, the positional information may comprise respective distinct sequence numbers corresponding to respective ones of a plurality of possible positions of the actual participants in the race. It is to be appreciated, however, that numerous other types and arrangements of content sources and associated positional information can be used in other embodiments.

DETAILED DESCRIPTION

Embodiments of the invention will be illustrated herein in conjunction with exemplary content delivery systems that include particular arrangements of networks, devices and other components. It should be understood, however, that embodiments of the invention are more generally applicable to a wide variety of other types of content delivery systems and associated networks, devices or techniques. The term "content" as used herein is intended to be broadly construed so as to encompass, for example, live video or other types of multimedia streams as well as other types of content that are deliverable to devices over one or more networks in a content delivery system.

Embodiments of the invention include but are not limited to methods, apparatus, systems, processing devices, integrated circuits, and computer-readable storage media having computer program code embodied therein.

Figure 1:
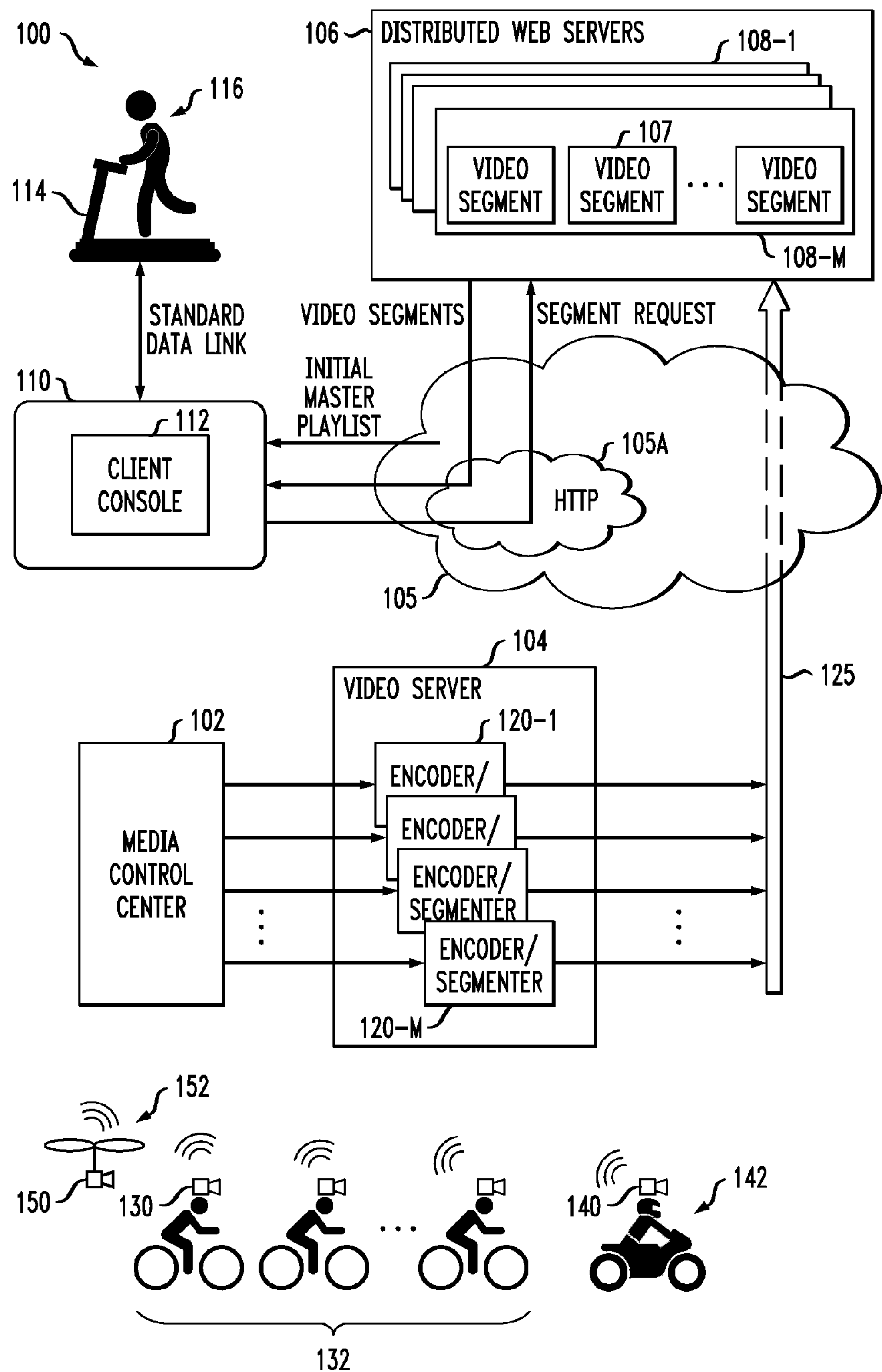
FIG. 1 shows an exemplary content delivery system with virtual immersion via streamed content adaptation in an illustrative embodiment.

FIG. 1 shows a content delivery system 100 configured to support faux racing via streamed video adaptation in one embodiment. Such streamed video adaptation is more generally referred to herein as "streamed content adaptation." In this embodiment, the system 100 comprises a media control center 102 configured to receive content from a plurality of sources, and a video server 104 that encodes and segments media streams from the sources. The particular example arrangement of sources in the present embodiment illustratively comprises respective live video sources associated with respective actual participants in a live event. More specifically, the live event in this embodiment is assumed to comprise a bicycle race and the actual participants comprise actual participants in the bicycle race, as will be described in more detail below. Other embodiments can be implemented utilizing other types of events and other arrangements of participants.

The video server 104 is coupled to a network 105 at least a portion 105A of which supports HTTP communications. It should be noted that, although HTTP communications are used in the present embodiment, other embodiments can utilize other types of protocols for media streaming over the Internet, or more generally any of a wide variety of other techniques for media content delivery.

Also coupled to the network 105 are multiple distributed web servers 106 configured for media streaming. Each such web server illustratively caches video segments 107 and associated index files received from the video server 104 over the network 105. For example, assuming that the media control center 102 and video server 104 provide M encoded and segmented content streams for a given event, each web server 106 will cache video segments 107 and associated index files for each of the M content streams. These content streams can be distributed from the video server 104 to the web servers 106 using existing Internet broadcast infrastructure, or other suitable content distribution techniques.

The resulting sets of cached video segments within a given one of the web servers 106 are denoted by reference numerals 108-1 through 108-M in the figure, although it is to be appreciated that each of the other web servers 106 will similarly cache video segments and associated index files for each of the M content streams. The distributed web servers 106 in some embodiments are implemented using standard off-the-shelf servers commonly utilized in conventional content delivery systems.

Each of the web servers 106 communicates over network 105 with at least one client device 110, also referred to herein as simply a "client." The system 100 can of course include multiple distinct clients, although only a single such client 110 is shown in the figure for clarity and simplicity of illustration. The client 110 comprises a client console 112. The client 110 communicates over a standard data link with a treadmill 114 operated by a user 116. The treadmill 114 is considered just one example of what is more generally referred to herein as "exercise equipment" and still more generally as "user equipment." Numerous alternative types of exercise equipment or other user equipment can be used in place of or in conjunction with the treadmill in other embodiments.

In the present embodiment, the client console 112 utilizes selected portions of multiple content streams in order to generate an additional content stream that it presents to the user 116. The multiple content streams are generated by the media control center 102 and the video server 104 from the live sources. The additional content stream is generated by the client console 112 in a manner that provides the user 116 with a dynamic vantage point within the live event, in this case within the bicycle race. The dynamic vantage point illustratively allows the user 116 to experience virtual immersion into the bicycle race. This is achieved in the present embodiment by switching between the selected portions of the particular ones of the multiple content streams as a function of input received from the treadmill 114 operated by the user 116. For example, the input received from the treadmill 114 illustratively comprises a velocity indicator generated as the user 116 runs on the treadmill 114.

The client console 112 configures the additional content stream presented to the user 116 such that the video content of that stream will vary in accordance with a virtual position of the user 116 amongst the actual participants in the bicycle race. The virtual position of the user 116 in the bicycle race is controlled in accordance with the speed at which the user runs on the treadmill 114. Accordingly, the additional content stream presented to the user 116 via the client console 112 includes video from different ones of the sources of the actual participants based at least in part on the input received from the treadmill 114.

The client 110 illustratively includes a built-in media receiver/player and a viewer application, although such components are not explicitly shown in FIG. 1. The media receiver/player and viewer application are illustratively implemented at least in part within or otherwise in association with an operating system of the client 110. The viewer application directs the built-in media receiver/player via a playlist illustratively containing index file URLs. The built-in media receiver/player is an example of what is more generally referred to herein as a "media player," a "client player" or simply a "player." It is to be appreciated that a wide variety of different players can be used, and such players need not be implemented using a built-in media receiver/player arrangement. Thus, a "player" as that term is broadly used herein should not be construed as being limited, for example, to a hardware-assisted media player that is built in to the operating system of a client device.

The video server 104 in the present embodiment comprises a plurality of encoder/segmenter modules 120-1 through 120-M, each of which is assumed to comprise a serial combination of an encoder and a segmenter. Media segments and associated index files are supplied by the video server 104 to at least a subset of the distributed web servers 106 over the network 105 via one or more connections 125.

It should be noted that, although the figure shows each of the M encoder/segmenter modules 120 being coupled to a corresponding one of M outputs of the media control center 102, this is by way of example only, and in other operating configurations of the content delivery system 100, each of the M outputs of the media control center 102 may be illustratively connectable to any of the M encoder/segmenter modules 120. For example, the outputs of the media control center 102 may be coupled to the encoder/segmenter modules 120 via a network or a bus, such that video from any of the sources can be provided to any of the encoder/segmenter modules. Thus, it is possible in some arrangements for a plurality of encoder/segmenter modules to be used in generating each of the multiple content streams.

In some embodiments, the media control center 102 and video server 104 are configured to generate a plurality of content streams offset from one another in time for each of the multiple content streams corresponding to respective ones of the live sources, possibly using techniques of the type described in U.S. patent application Ser. No. 14/546,614, filed Nov. 18, 2014 and entitled "Methods and Apparatus for Reducing Latency Shift in Switching between Distinct Content Streams," which is incorporated by reference herein in its entirety. These techniques advantageously reduce latency when switching between content streams. It is to be appreciated, however, that utilization of such techniques is not a requirement of the present embodiment or other embodiments herein.

In an embodiment that generates a plurality of content streams offset from one another in time for each live source, a separate set of encoder/segmenter modules 120 may be provided within video server 104 for each of the live sources. Additionally or alternatively, multiple instances of the video server 104 can be implemented within the system 100, for example, with each such video server providing a set of encoder/segmenter modules 120 for just one of the live sources. Thus, a given implementation of video server 104 comprising encoder/segmenter modules 120 can illustratively be associated with only one of the live sources. The term "video server" as used herein is intended to be broadly construed, so as to encompass these and other arrangements of one or more sets of encoders and segmenters.

Moreover, although the encoder/segmenter modules 120 each comprise a serial arrangement of an encoder and a segmenter, in other embodiments separate modules can be used to implement respective encoding and segmentation functionality. Such modules may comprise, for example, an integrated circuit or a portion of an integrated circuit.

The encoding of video in the FIG. 1 embodiment can utilize known encoding techniques such as H.264. Also, the segmenting of the encoded video can be performed in accordance with known streaming protocols such as Apple HTTP Live Streaming (HLS) or Microsoft Smooth Streaming (MSS). It is to be appreciated, however, that a wide variety of different encoding and segmenting techniques can be used in other embodiments, including those techniques described in the above-cited U.S. patent application Ser. No. 14/546,614.

Each of the web servers 106 stores multiple index files as well as sets of video segments 107 associated with respective ones of those index files. The index files are not explicitly shown in the figure. A wide variety of different arrangements of index files and associated video segments can be used in a given embodiment.

The live sources in the FIG. 1 embodiment more particularly include wireless video cameras 130 associated with a set of actual participants 132 in the bicycle race. The wireless video cameras are illustratively mounted on helmets of respective ones of the actual participants 132, and are examples of what are more generally referred to herein as participant-mounted wireless video cameras. Additional live sources include a wireless video camera 140 mounted on a helmet of a motorcyclist 142, and a wireless video camera 150 mounted on a drone 152.

In the particular positioning illustrated in the figure, the wireless video camera 140 is at the front of the race, ahead of a first one of the actual participants 132, and the wireless video camera 150 is at the back of the race, behind a final one of the participants 132. As the race progresses, the positions of the wireless video cameras 130, 140 and 150 can change. For example, the relative positions of the actual participants 132 and their associated wireless video cameras 130 will naturally tend to vary over the course of the race. Also, the motorcyclist 142 and drone 152 and their respective wireless video cameras 140 and 150 may move about relative to the actual participants 132 and to one another.

Other arrangements of additional or alternative live sources are possible, including, for example, one or more additional vehicle or drone mounted wireless video cameras that can move between actual participants. Such additional mobile wireless video cameras can facilitate the filling of content voids that might otherwise arise in situations in which large gaps have opened between the participants.

The wireless video cameras 130, 140 and 150 in this embodiment are assumed to communicate wirelessly with the media control center 102. In other embodiments, the functionality of the media control center 102 and video server 104 can be combined into a single system component configured to communicate wirelessly with the wireless video cameras 130, 140 and 150.

By way of example, one or more of the wireless video cameras 130, 140 and 150 may comprise respective personal video cameras, such as GoPro Hero cameras, which can illustratively be configured to operate autonomously or via remote control. These or other video cameras utilized in illustrative embodiments can be configured to capture high-resolution video and can be equipped with wide-angle lenses.

These cameras are distributed amongst the group of athletes participating in the bicycle race, and are assumed to be moving with the race participants. Ideally, each real venue athlete will have at least one collocated camera capturing video from an actual competitor perspective. As noted above, the wireless video cameras 130, 140 and 150 are configured to transmit live video wirelessly to the media control center 102. The transmission of live video from the wireless video cameras may utilize, for example, cellular or WiFi technology, or other types of networks, and may additionally or alternatively utilize one or more relay vehicles or other system elements as intermediaries as needed.

For example, in some embodiments, at least a subset of the wireless video cameras 130, 140 and 150 are configured to stream live video to an intermediate device, such as a stationary or mobile access point or base station along a race route, from which the live video is subsequently delivered to the media control center 102. Alternatively, at least a portion of the media control center 102 can be implemented within such an access point or base station, or within associated network equipment coupled to the access point or base station.

Each of the wireless video cameras 130, 140 and 150 is assumed to include GPS functionality or another type of location determination functionality that is utilized by the wireless video camera to report its location to the media control center 102.

Examples of alternatives to GPS for use in generating location information for respective ones of the wireless video cameras include laser, optical or radio positioning systems. Such location information may be transmitted on a substantially continuous basis from the wireless video cameras to the media control center 102. The location information can additionally or alternatively be transmitted with the live video as metadata. The location information need not have any particular format, and a wide variety of different types and formats of such information can be utilized.

The media control center 102 utilizes the location information received from respective wireless video cameras in generating an example of what is more generally referred to herein as "positional information." The positional information may be configured so as indicate for each of the wireless video cameras 130, 140 and 150 its current position in a set of possible positions relative to other ones of the wireless video cameras. For example, in the present embodiment, the positional information can comprise a current ordinal sequencing of the wireless video cameras 130, 140 and 150 within the bicycle race.

In such an arrangement, the positional information is illustratively generated by the media control center 102 responsive to location information provided by respective ones of the wireless video cameras 130, 140 and 150. The media control center 102 in the present embodiment utilizes the positional information in assembling content from the wireless video cameras 130, 140 and 150 into multiple content streams.

In some embodiments, at least portions of the positional information may be provided to the media control center 102 by respective ones of the wireless video cameras, possibly as metadata transmitted along with the content, instead of or in addition to being generated by the media control center 102. For example, each of the wireless video cameras can be configured to detect other wireless video cameras in their vicinity and to report associated positional information to the media control center 102. Numerous alternative techniques can be used for obtaining at least portions of the positional information. For example, it is possible in some embodiments that the media control center 102 can obtain at least portions of such information from other sources such one or more radio network controllers of a cellular system. These and other illustrative arrangements are intended to be encompassed by the term "generating positional information" as that term is broadly used herein. Moreover, the positional information can include various combinations of different types of location information or information derived from such location information. Terms such as "positional information" and "set of possible positions" are intended to be broadly construed. The latter can, for example, include a discrete set of possible positions or points along a substantial continuum of possible positions.

The media control center 102 operates in cooperation with the video server 104 to generate the above-noted multiple content streams comprising respective portions of the content received from respective ones of the wireless video cameras 130, 140 and 150. The multiple content streams are assumed to be generated based at least in part on the positional information and a current mapping between the content streams and wireless video cameras. For example, a given one of the content streams may be configured to include content from whichever one of the participant-mounted wireless video cameras is determined to be currently in a first position of a set of multiple possible positions within the bicycle race. Moreover, the mapping of content streams to wireless video cameras can change over time as the relative positions of the wireless video cameras change during the course of the bicycle race.

Accordingly, the positional information in the present embodiment illustratively indicates current positions of the actual participants 132 in the bicycle race. For example, the positional information may comprise respective distinct sequence numbers corresponding to respective ones of multiple possible positions of the actual participants in the race. Numerous alternative types of positional information can be used in other embodiments.

In generating the multiple content streams, the portions of the content received from respective ones of the wireless video cameras 130, 140 and 150 are encoded in respective encoders of the encoder/segmenter modules 120 of the video server 104 and the encoded portions are segmented into respective streams of video segments in respective segmenters of the encoder/segmenter modules 120.

The resulting multiple content streams are transmitted with their associated positional information over the network 105 utilizing the one or more connections 125. This illustratively involves transmitting corresponding streams of video segments to the distributed web servers 106 over the network 105. The associated positional information is transmitted in some embodiments as content stream metadata, although other techniques for transmitting positional information can be used. It is also possible in some embodiments that the positional information can be transmitted at least in part in an implicit manner.

For example, the content streams can be indexed in a manner that conveys the relative positioning of the corresponding wireless video cameras. More particularly, live video from the wireless video camera of the current first place participant can be automatically assigned to the first one of the M content streams, live video from the wireless video camera of the current second place participant can be automatically assigned to the second one of the M content streams, and so on. Thus, the total number of content streams can be configured in some embodiments to correspond to the number of wireless video cameras, with the mapping of content streams to wireless video cameras changing over time as the relative positions of the wireless video cameras change over the course of the race.

The media control center 102 is also configured in the present embodiment to detect changes in position of the wireless video cameras 130, 140 and 150 as the race progresses, and to alter the mapping between the content streams and the wireless video cameras responsive to such changes in position. For example, a different participant 132 may move into the first place position, such that live video from its corresponding one of the wireless video cameras 130 is inserted into the content stream corresponding to the first position. Similarly, other participants 132 and possibly the motorcyclist 142 and drone 152 may have changed their positions and accordingly have their respective live video inserted in different ones of the content streams.

This is an example of what is more generally referred to herein as an "altered mapping" between the content streams and the wireless video cameras. The generation and transmission of the content streams, and possibly one or more other operations associated therewith, are then repeated utilizing the altered mapping.

The media control center 102 can additionally or alternatively be configured to perform other types of video processing. For example, the live video streams received from respective ones of the wireless video cameras can be processed to eliminate nearly identical views from cameras that are closely bunched. Other types of video processing may be performed such as cropping and panning to better align the various views. The resulting processed video feeds are then encoded, segmented and then distributed as multiple content streams to the web servers 106, possibly utilizing existing Internet streaming infrastructure suitably adapted to the techniques disclosed herein. The multiple content streams are illustratively distributed along with the positional information characterizing current positions of the cameras and the current mapping between the content streams and the cameras. The distributed web servers 106 can be potentially widely geographically dispersed.

In the FIG. 1 embodiment, the content streams are generated in a manner that permits the client 110 to provide the user 116 with a dynamic vantage point within the bicycle race by switching between the content streams. More particularly, in this embodiment the dynamic vantage point is determined at least in part as a function of input received from the treadmill 114 operated by the user 116. The input received from the treadmill 114 in this embodiment is assumed to comprise a velocity indicator generated as the user 116 runs on the treadmill. Accordingly, the view of the race presented to the user 116 includes live video from actual participants which varies based on how fast the user runs on the treadmill 114, thereby allowing the user 116 to experience virtual immersion into the bicycle race.

It is expected that in a given implementation of the FIG. 1 embodiment, the majority of the wireless video cameras 130 associated with respective ones of the actual participants 132 will at most times be pointed in the same general direction facing forward along the current direction of the race route. Similarly, the dynamic vantage point provided to the user 116 would typically be aligned with this direction, such that a given one of the participant views can be easily adapted as the user view at a particular time. This embodiment involving input from the treadmill 114 gets the user moving and makes the user feel as if he or she were participating in the race, expending effort and energy on the treadmill in order to compete for position with the actual participants in the ongoing race.

Accordingly, the content delivery system 100 of FIG. 1 system is illustratively configured such that client console 112 in communication with treadmill 114 will interactively select and manipulate video content streamed live from multiple wireless video cameras 130, 140 and 150 dispersed amongst real competitors in an actual physical event. In the FIG. 1 embodiment, the video content is captured at least in part from the perspectives of respective actual participants and manipulated by the client console 112 to create the sensation that the user 116 is racing in real time against actual participants in the race.

The display presented via the client console 112 therefore adjusts its perspective to at least partially match what the user 116 might see if he or she were in the midst of the actual race. This allows the user to both watch a live broadcast event as well as feel like he or she is participating in the race against professional athletes.

The live video from the wireless video cameras 130, 140 and 150 can be streamed within the content delivery system 100 utilizing HTTP streaming technology such as the above-noted HLS or MSS protocols. With HTTP streaming, video associated with a given content stream is first compressed and then segmented at the video server 104. As soon as a given video segment is ready, it is delivered to the web servers 106 so as to be available for mass distribution within the system. At session initiation, the client console 112 obtains an initial master playlist indicating the available content streams and their associated web addresses (e.g., URLs). Depending on the streaming technology, locating the available content streams may be an indirect process where the master playlist points to index files that can be polled to indicate the URL address and availability of the next segment.

In some implementations of the FIG. 1 embodiment, the system 100 provides a faux racing game supported by a television and associated video game system, or other arrangement of one or more processing devices. Various hybrid combinations of multiple such processing devices may also be used.

As indicated previously, the multiple content streams generated by the media control center 102 and the video server 104 are provided over the network 105 to the distributed web servers 106 so as to be accessible to the client 110 in generating the additional content stream for presentation to the user 116.

Figure 2:
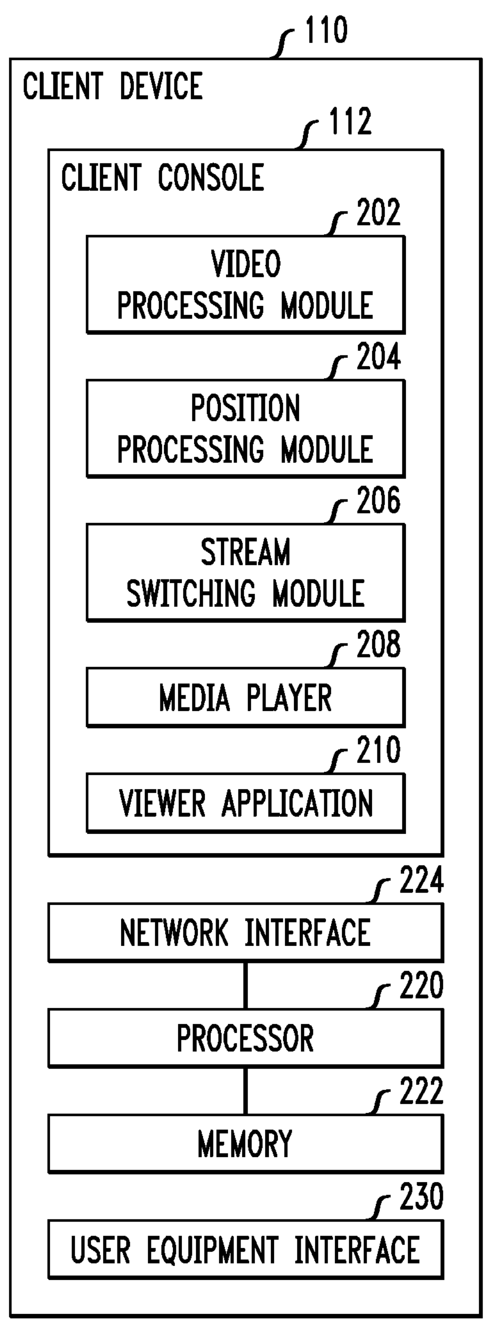
FIG. 2 shows a more detailed view of one possible implementation of a client device in an illustrative embodiment.

Referring now to FIG. 2, one possible implementation of client 110 in an illustrative embodiment is shown. In this embodiment, client console 112 of client 110 comprises a number of modules that are utilized in conjunction with generation of the additional content stream for presentation to the user 116. These modules include a video processing module 202 configured to process video segments retrieved from the distributed web servers 106, and a position processing module 204 configured to process positional information associated with the video segments and to utilize the positional information and a velocity indicator received from the treadmill 114 in order determine a current position of a dynamic vantage point of the user 116 within the ongoing bicycle race.

The client console 112 further comprises a stream switching module 206, a media player 208 and a viewer application 210. These modules of the client console are utilized in conjunction with retrieving and playing back particular video segments based on information provided by the video processing module 202 and the position processing module 204.

The client 110 can be implemented using any type of mobile device or more generally any type of client device, including, for example, desktop, laptop or tablet personal computers, cellphones or other types of smart phones, smart televisions, smart watches, gaming consoles, gaming systems and other types of processing devices. A client device is therefore considered an example of what is more generally referred to herein as a "processing device." The client 110 in some embodiments is integrated into the treadmill 114, but in other embodiments is a stand-alone device such as a mobile telephone or a laptop or tablet computer.

The client 110 further comprises a processor 220 coupled to a memory 222 and to a network interface 224.

The processor 220 executes software code stored in the memory 222 in order to control the performance of processing operations and other functionality. The network interface 224 supports communication over one or more networks, such as communication between the client 110 and the distributed web servers 106 over network 105, and possibly also communication between the client 110 and the treadmill 114. The latter communication between the client 110 and the treadmill 114 additionally or alternatively involves usage of user equipment interface 230. For example, user equipment interface 230 can include local area network (LAN) functionality for permitting wireless communication between the client 110 and the treadmill 114. Other types of wireless communication technologies can be used to implement the standard data link between the client 110 and the treadmill 114, such as Bluetooth or near field communication (NFC) wireless communication technologies.

The processor 220 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 222 stores software code for execution by the processor 220 in implementing portions of the functionality of the client 110. A given such memory that stores software code for execution by a corresponding processor is an example of what is more generally referred to herein as a computer-readable storage medium having computer program code embodied therein, and may comprise, for example, electronic memory such as SRAM, DRAM or other types of random access memory, read-only memory (ROM), magnetic memory, optical memory, or other types of storage devices in any combination.

Articles of manufacture comprising such computer-readable storage media are considered embodiments of the invention. The term "article of manufacture" as used herein should be understood to exclude transitory, propagating signals.

In addition, some embodiments may be implemented in the form of integrated circuits comprising processing circuitry configured to implement processing operations associated with content delivery.

Other system components such as media control center 102 and video server 104 can similarly be implemented utilizing one or more processing devices each comprising a processor coupled to a memory.

It should be noted that the above-described system and client arrangements are exemplary only, and alternative arrangements can be used in other embodiments. For example, the disclosed techniques can provide significant advantages in numerous other stream adaptation applications, including stream adaptation in content delivery contexts other than those involving live video or virtual immersion into live events.

In these and other embodiments, various alternative arrangements of software and hardware components can be utilized to implement functionality such as encoding and segmenting of content from multiple sources, distributing the encoded and segmented content for accessibility to client devices, and generating and presenting additional content streams to users in a convenient and easy to use format.

The operation of an exemplary client such as client 110 will now be described in greater detail with reference to the flow diagram of FIG. 3. The process as shown in the figure includes steps 300 through 308, which in some embodiments are assumed to be performed by the client 110 utilizing multiple content streams for which video segments can be retrieved from the distributed web servers 106 via the HTTP portion 105A of the network 105. As described previously, the multiple content streams for which video segments are stored in the distributed web servers 106 are generated by cooperative operation of the media control center 102 and video server 104 using live video feeds from the wireless video cameras 130, 140 and 150 during the course of a live event, in this case a bicycle race.

In step 300, information characterizing multiple content streams is obtained. The multiple content streams comprise respective portions of content received from respective ones of a plurality of sources. More particularly, in the context of the FIG. 1 embodiment, the sources comprise respective ones of the wireless video cameras 130, 140 and 150. The information obtained by the client 110 in this step illustratively comprises playlists, such as an initial master playlist and one or more subsequent playlists, which indicate the availability of one or more video segments for each of one or more of the multiple content streams. A wide variety of different types, arrangements and combinations of indexing, playlists and other information can be used in this step to indicate to the client 110 the particular video segments that are available to it at any given time.

In step 302, positional information for the sources is obtained. The positional information illustratively indicates for each of the sources its current position in a set of possible positions relative to other ones of the sources. Thus, in the context of the bicycle race illustrated in FIG. 1, the positional information can indicate which of the multiple content streams having available video segments are associated with particular ones of a plurality of possible positions within the bicycle race.

As mentioned previously, it is possible that the positional information can be implicit within the multiple content streams. An example of an arrangement of this type is one in which the multiple content streams are assigned, for at least a designated period of time, to particular ones of the possible positions, such that whichever wireless video camera happens to be in a given position at a certain time will automatically have its video inserted into the corresponding assigned one of the multiple content streams.

In step 304, an additional content stream is generated comprising selected portions of particular ones of the multiple content streams based at least in part on the positional information, a mapping between the content streams and the sources, and input from user equipment operated by the user. For example, in the FIG. 1 embodiment, the additional content stream can be generated by the client 110 utilizing video segments of one or more of the multiple content streams as retrieved from the distributed web servers 106 utilizing playlists, indexes or other information obtained in step 300. The video segment retrieval illustratively makes use of a current value of a velocity indicator received from the treadmill 114, in conjunction with current values of the positional information and the content stream to source mapping. The positional information in such an arrangement illustratively indicates which of the wireless video cameras 130, 140 and 150 is associated with which of a plurality of different possible positions within the bicycle race. The mapping between the content streams and the sources in such an arrangement illustratively indicates which of the multiple content streams are currently carrying video from which of the wireless video cameras 130, 140 and 150.

As noted above, in some embodiments, particular content streams can be assigned to particular ones of a set of possible positions in the bicycle race, at least temporarily, such that whichever wireless video camera happens to be in a given position has its video inserted into a corresponding one of the content streams. In these and other embodiments, it is possible for the positional information and the content stream to source mapping to at least partially overlap or to be at least partially duplicative at some points in time. Numerous alternative configurations of positional information and content stream to source mappings can be used in other embodiments, and terms such as "positional information" and "mapping" as used herein are therefore intended to be broadly construed. Moreover, positional information indicating the current position of a source in a set of possible positions relative to other sources is also intended to be broadly construed. For example, such positional information in some embodiments can include measurements of distance of each source from a reference point, and additionally or alternatively can convey relative position ordering. Numerous other types of positional information can be utilized in other embodiments.

In step 306, the additional content stream is presented to a user. For example, in the context of the FIG. 1 embodiment, the client console 112 illustratively presents the additional content stream to the user 116 via a display screen of the client 110.

As previously described, the additional content stream is generated so as to provide the user with a dynamic vantage point within a live event by switching between the selected portions of the particular ones of the multiple content streams, with the dynamic vantage point being determined in the FIG. 1 embodiment at least in part as a function of input received from the treadmill 114 operated by the user 116.

The input illustratively comprises a velocity indicator generated as the user 116 operates the treadmill 114. The velocity indicator in some embodiments is integrated by the client console 112 over a designated measurement interval in order to determine a current position of the user 116 that can be compared on relative terms to the respective positions of the actual participants 132 in the race. Alternatively, the velocity indicator itself may comprise such integrated velocity information, possibly provided directly by the treadmill 114 via the user equipment interface 230. These and other arrangements of velocity data are assumed to fall within the term "velocity indicator" as that term is broadly utilized herein.

In step 308, at least portions of steps 302 through 306 are repeated substantially continuously so as to continue to provide the user with the above-noted dynamic vantage point into the ongoing live event. The dynamic vantage point in the context of the FIG. 1 embodiment illustratively varies as a function of changes in one or more of the positional information, the mapping between the content streams and the sources, and the input from the treadmill 114 operated by the user 116. In other embodiments, it is also possible that at least portions of step 300 may be repeated, in addition to repetition of at least portions of steps 302 through 306 as illustrated in the figure.

Figure 3:
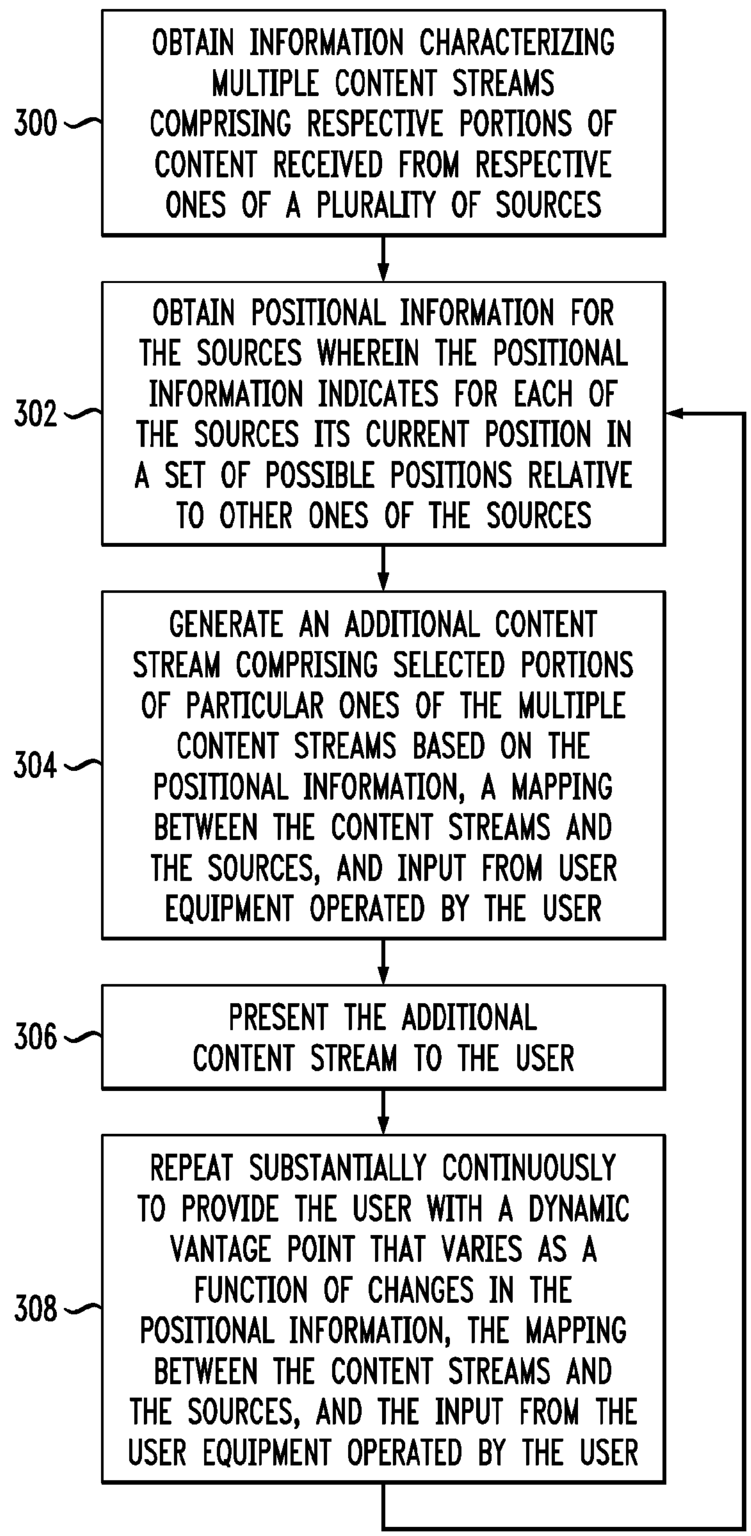
FIG. 3 is a flow diagram of an example process implemented by a client device in an illustrative embodiment.

The various steps of the FIG. 3 process in the context of the FIG. 1 embodiment are performed primarily by the client 110 and involve utilization of video processing module 202, position processing module 204, stream switching module 206, media player 208 and viewer application 210.

In one possible implementation of the FIG. 1 embodiment, the user 116 operating the treadmill 114 can initiate access to the faux racing streamed video adaptation at any time during the race via the client console 112.

On initiation, the client console 112 downloads the lists of all suitably-located streams from a service provider website and selects one to start viewing. At that point, the client console 112 obtains the position of the wireless video camera that captured the first selected stream, and initializes the virtual position of the user 116 to that position.

Subsequently, the client console 112 controls the virtual position of the user 116 by continuously integrating velocity data received as input from the treadmill 114. If at any point in time the virtual position of user 116 matches the position of the wireless video camera that captured the stream just ahead of the current stream, the client console 112 will automatically switch to video from that forward stream. Such an arrangement allows the user to effectively "pass" an actual participant. Alternatively, if the relative pace of user 116 is such that his or her virtual position falls behind the position of the current stream, the client console 112 automatically switches to video from a wireless video camera that captured the stream just behind the current stream as appropriate.

In many instances, the virtual position of the user 116 will be between cameras. As such, the video presented by the client console 112 should be modified to accommodate the perspective shift between the camera video being streamed and the virtual position of the user 116. A number of difficulties can arise in attempting to fully correct for such perspective shift by manipulating captured video, possibly due to limitations in various system components. For example, the relative positions of objects in captured video cannot be easily changed, and new visual information cannot be easily added, such as the side view of an approaching object. However, one key aspect, that of the apparent size of an object growing or shrinking as it approaches or recedes, can be simulated by digital zooming, possibly through cropping of the video images. This effect provides sufficient visual cues for the user 116 to experience the thrill of a chase.

By way of example, assume that even at close distance, an average actual participant is narrower in width than the standard visual field, such that the width of the average actual participant can be used as a convenient reference parameter for apparent size calculation. Denoting average actual participant width as w and angle of view presented on screen as v, then the fraction of the screen width occupied by the participant at a distance x ahead is roughly $2*\arcsin(0.5*w/x)/v$. However, if the virtual position of user 116 is at a distance y where y is less or equal to x, then the screen width occupation fraction should instead be $2*\arcsin(0.5*w/y)/v$. In other words, knowing x and y at any given time, the image of the actual participant ahead of the current virtual position of the user 116 should be digitally magnified by the ratio $\arcsin(0.5*w/y)/\arcsin(0.5*w/x)$. As x and y are assumed to change continuously in this embodiment, the magnification ratio could be continuously adjusted as well.

As the virtual position of the user 116 approaches the position of an actual participant, simulated passing should take place to avoid a virtual collision. Here, as the distance reaches a preset limit, the client console 112 digitally pans the view either left or right depending on the position of the actual participant in the video. If the actual participant being passed is currently to the right of center, the client console 112 pans left to simulate passing to the left, and vice versa. This technique is facilitated by capturing each video stream at a wider angle of view than that normally presented to the user 116.

It should be noted that the virtual position of the user in the present embodiment is illustratively configured so as to be continuously variable. For example, as the virtual position of a given user moves forward and back within the pack of actual participants, the vantage point provided to that user can be adjusted on a substantially continuous basis so as to avoid any "jumpiness" or "jerkiness" in the presented video.

Due to variation in capabilities between system users and also between their corresponding different types of exercise equipment, a handicapping technique can be utilized in some embodiments. For example, an embodiment can be configured to allow the user 116 to initially select a gain factor where the pace of the exercise equipment is multiplied prior to virtual position calculation. During a race, the gain can be automatically adjusted to allow the user 116 to keep up with the actual participants. In particular, the gain factor could be adjusted to keep the virtual position of user 116 from falling behind the last camera 150 or speeding ahead of the lead camera 140. At the end of a session, the average gain of the user 116 can be used to compare results with other users, or recorded for use in initiating future races. Through the use of archived video, the system can be configured to allow user 116 to repeat a race and to track progress by comparing the average gains between multiple instances of the race.

As another illustration, regardless of the particular streaming protocol utilized, the content streams may be assigned a sequence number based on the positions of their respective corresponding cameras within the race. For example, assuming that the stream from a camera towards the front of the race has a sequence number j, then a stream with sequence number j+1 should be captured by a camera positioned immediately behind the camera that captured stream j, and a stream with sequence number j−1 should be captured by a camera positioned immediately ahead of the camera that captured stream j.

Since the cameras in the physical racing venue can swap position at any time, the sequence numbers are not attached to the cameras themselves. In other words, a given stream URL may point to video from any of the cameras as sequenced by the media control center 102. This simplifies the task for switching from stream to stream for the client console 112. If the current view is from a stream with sequence number j, the console can switch view to a camera just behind or just ahead by looking up the URL of the stream with sequence j+/−1 from the master playlist. Alternatively, the stream sequence number could be part of the URL itself.

As described earlier, positional information can be streamed in-band as metadata along with each content stream. An exemplary minimum set for basic operation in some embodiments includes the position of the camera that captured the video, the position of the camera just ahead, and the position of the nearest actual participant in the current video at a single instance for each video segment. Interpolation with data from multiple segments can be used to derive approximate position at other instances.

For simplicity, position in some embodiments can comprise a one-dimensional measure of distance traveled along the centerline of the race route. However, to implement features such as simulated passing, the deviation from the centerline of the actual participant in the video from the camera immediately ahead should also be streamed. This information can be extracted by image processing of the video at the media control center 102.

As noted above, the positional information utilized in some illustrative embodiments can comprise the positions of the actual participants recorded as distances from a reference point, in predetermined units such as meters. Such positional information can be streamed as metadata with the corresponding video content. Also, index numbers or sequence numbers can be used to order the content streams.

It should also be noted that a master playlist in a given embodiment can include URLs for respective content stream playlists. The playlists themselves need not include any positional information, just the URL identifying the latest available segment. However, the above-noted ordering based on index numbers or sequence numbers can be used to infer relative positioning of the streams.

As mentioned previously, the index or sequence number can be included as part of the URL in order to facilitate stream switching. For example, such an arrangement can be configured to ensure that if the client console 112 is streaming content from stream j, it knows that stream j+1 includes the content from the position just behind and that stream j−1 includes the content from the position just ahead, even without knowing any measured positional information from the stream j+1 or the stream j−1.

Accordingly, initialization for a given user can occur using any one of the available content streams, with positional information being obtained from the metadata of the selected content stream. The user can therefore start at the back of the pack, the middle, or the front. Once the client console 112 starts streaming the selected content stream, the actual position associated with that stream as determined from the stream metadata is selected as an initial position of the user within the pack. Each of the segments 107 may include several seconds of video and associated audio information. In practice, positional information may be obtained, for example, with every few video frames, and therefore multiple times per second. As the virtual position of the user changes, stream switching occurs and updated positional information is obtained from the new content stream currently being streamed. Again, positional information as that term is broadly used herein can include measured positional information, as well as additional or alternative types of information that is indicative of positions of actual participants relative to one another or otherwise utilizable in determining such positions.

It is to be appreciated that the particular processing operations described in conjunction with the FIG. 3 embodiment are illustrative only, and other embodiments could include different types and arrangements of operations. Also, the ordering of the processing operations can be varied in other embodiments. For example, operations illustratively shown in the figure as being performed serially relative to one another can alternatively be performed at least in part in parallel with one another.

The illustrative embodiments described above can provide considerable advantages over conventional arrangements. For example, by providing a user with a dynamic vantage point determined based on actual video captured by participant-mounted video cameras in a given event, embodiments can provide a virtual immersion experience that is much more realistic, interesting and engaging than that of conventional massively multiplayer online (MMO) games and other conventional simulated racing games in which presence within a virtual space is typically represented by a digitally animated avatar. A typical feature of such simulated racing games is that all players are virtual participants only. In this regard, the virtual immersion experience provided in one or more of the illustrative embodiments advantageously captures the unpredictability and actual participant imagery often associated with a live event broadcast but in a manner that encourages the user to exercise vigorously rather than to simply watch the live event in a passive and sedentary manner. For example, the actual participants in a given live event, corresponding to a charity fundraiser bicycle race, car race or other type of competition or game, may be celebrities, thereby providing a user with additional incentive to keep up with his or her favorite celebrity.

Although the illustrative embodiments can be advantageously configured to operate in real time using streaming video and associated positional information collected, processed and distributed from a live event, it is also possible for these and other embodiments disclosed herein to be configured to operate with streaming video and associated positional information that are recorded for subsequent collection, processing and distribution within the content distribution system. An arrangement of the latter type could be utilized, for example, with one or more live events in which real-time transmission is not practically feasible.

Other embodiments can include additional or alternative features, examples of which will now be described.

As one example, for enhanced entertainment, the camera view options can be greatly increased with ultra wide view lenses, rear mounted cameras, or even 360 degree image capture to allow sideward or even backward views. The client console 112 can provide various control mechanisms such as a slider to allow manual panning of the presented view. After virtually passing a competitor, it would be possible for the user 116 to look back and see the face of that competitor close up. When looking back, the console automatically switches to a video stream from a rear-facing camera just ahead.

Another possible added dimension in terms of entertainment value is audio. Each camera and each actual participant can be equipped with microphones to capture audio. For extra flexibility, the audio streams may be transmitted separately from the video streams, but time-stamped and tagged with each stream's capture location. The client console 112 can be configured to mix the audio to create a combination of ambient noise and voices from the actual participants. One useful illusion is to amplify the level and clarity of the voice of a given actual participant, as the virtual position of the user 116 gets closer to the position of that actual participant. Simultaneously, all other sounds are faded as the user moves virtually away from the source position. This adds the incentive to keep up with a particular actual participant in the video in order to hear more clearly what he or she has to say. For example, in the above-noted celebrity participant case, users would be motivated to exercise at a higher rate in order to continue to hear what their favorite celebrities have to say during the race. The switching between audio streams can be separate from and independent of the switching between video streams. For example, audio can be played from an audio source associated with a given position while video is played from a video source associated with another position.

Accordingly, in some embodiments, the thrill of the chase provided to user 116 during a race can be enhanced by audio which adds to the immersive effect and provides additional inducements to perform. For example, in an embodiment in which the actual participants are celebrities equipped with microphones, when a user is virtually approaching an actual participant in front, as the target celebrity looms larger visually, the client console 112 can be programmed to selectively amplify the celebrity's utterances.

Implementation of such a feature may require modification of existing streaming media protocols regarding the packaging and playback of the audio with respect to its associated video. With typical streaming media protocols, if the client 110 is showing portions of a video from a stream, the audio streamed along with that video would also be played. This would mean the client 110 is playing both video and audio from the actual participant carrying the camera just behind the current virtual position of the user. In a given enhanced audio embodiment, however, if the virtual position of the user is between the positions associated with streams j and j−1, the client 110 could play audio from both of the streams with the one closer to the virtual position of the user being played at a higher volume than the other.

Embodiments of this type can configure the distributed web servers 106 so as to allow the client 110 to request one stream, with both audio and video, and simultaneously request only audio from a separate stream. This would require the web servers 106 to have the ability to unbundle the audio portion from a media stream.

Alternatively, audio streams could be streamed separately from the video streams in one or more embodiments. In such embodiments, each audio stream can carry its own set of positional information. Also, each audio stream can be indexed in the same way as the video streams to indicate relative position and relationship with the associated video. Arrangements of this type allow the client 110 to play audio from any position at any time.

In some embodiments, at least a subset of the cameras are implemented as three-dimensional (3D) cameras. Generally, two cameras mounted side by side are needed to capture a 3D image. With this option, distance to various objects can be calculated by parallax comparison of the corresponding images captured by the two side-by-side cameras. An additional benefit is that with additional video information (e.g., each camera getting a slightly more sideward view of an object) a more convincing perspective change as the user virtually approaches an object in a video can be simulated.

As another example, instead of a single instance of position metadata per video segment, which may be approximately 10 seconds apart, the system can benefit from more frequent availability of position metadata.

In some embodiments, the exercise equipment can be calibrated, such that the client console 112 can be programmed to allow remote racing with other virtual participants in real-time. For example, if the console can modulate the resistance of the exercise equipment, terrain metadata can be used to allow hill simulation. Also, as mentioned previously, handicapping techniques can be used to accommodate users of different abilities.

Furthermore, even though the real-time aspect of certain illustrative embodiments is an advantageous feature, a user can access prerecorded event streams to view and race against. Depending on the pacing of the user, the way the streams are selected and presented by the client console 112 may vary dramatically so the recordings have longer lasting entertainment value. Accordingly, embodiments of the invention are not limited to use with live video or other specific types of media content.

Moreover, as mentioned previously, embodiments of the invention are not limited to use with faux racing. Numerous other applications involving streamed video adaptation are possible through straightforward modification of the disclosed techniques, as would be appreciated by one skilled in the art.

For example, the disclosed techniques can be adapted in a straightforward manner for use with a wide variety of other types of live sporting events, such as a football game, basketball game, golf tournament or any other sporting event in which multiple participants could be outfitted with wireless video cameras.

As a more particular example, caddies, scorekeepers and other individuals that are "inside the ropes" at a golf tournament could be equipped with wireless video cameras and the streamed video adaptation applied in that context. In an arrangement of this type, the positional information could relate to current positions of the wireless video cameras in regions of a grid overlaid on a map of the golf course, with a user being virtually immersed in the course through exercising on a treadmill or operating other types of user equipment that presents a map of the golf course. The user can therefore effectively "walk" the course, and the client console would automatically switch among the camera views using techniques similar to those described above in the racing context. Additionally or alternatively, the user could be provided with a device that allows the user to move his or her virtual position in two or more dimensions.

Such an embodiment allows a user to exercise on a treadmill with access to an interactive map and move about the course viewing the live action as if actually present at the course. The speed at which the user exercises on the treadmill in combination with positional information for the multiple wireless video cameras would control how quickly the presented content stream switches between different camera views. It is also possible to include piloted roving robots or drones each equipped with a wireless video camera in order to fill in gaps between the participant-mounted wireless video cameras. As mentioned above, the video processing could be adapted to reduce any "jumpiness" or "jerkiness" in transitioning between camera views.

Racing embodiments described herein with reference to bicycles can be similarly adapted to races involving other types of vehicles, such as car races or motorcycle races, as well as to other types of races such as track races, marathons, triathlons, etc.

Other embodiments can involve alternative sporting events such as football games or basketball games. Arrangements of this type can similarly overlay a grid on the playing area and generate positional information indicating current positions of participant-mounted wireless video cameras within particular regions of the grid.

It should also be noted that HLS, MSS and other HTTP streaming protocols typically accommodate adaptive streaming techniques where each stream is encoded at different quality levels, requiring different amounts of bandwidth to download. The media player 208 of the client console 112 can be informed of the available choices of quality levels via one or more playlists. The media player 208 can be configured to automatically choose which bitrate stream to request based on display resolution and link speed. The FIG. 1 embodiment is fully compatible with adaptive streaming with straightforward configuration of additional video encoders and stream segmenters.

Some embodiments are configured to utilize streaming techniques that are based at least in part on the above-noted HLS or MSS protocols. However, it is to be appreciated that other embodiments can be configured utilizing a wide variety of other types of streaming protocols and accordingly are not limited to use with live streaming or HTTP.

The particular configurations of content delivery systems described herein are exemplary only, and a given such system in other embodiments may include other elements in addition to or in place of those specifically shown, including one or more elements of a type commonly found in a conventional implementation of such a system.

For example, in some embodiments, a content delivery system may be configured to utilize the disclosed techniques to provide additional or alternative functionality unrelated to faux racing or exercise equipment. The disclosed techniques can be similarly adapted for use in a wide variety of other types of content delivery systems, and in numerous alternative stream adaptation contexts involving other types of user equipment.

It is also to be appreciated that the particular process steps used in the embodiments described above are exemplary only, and other embodiments can utilize different types and arrangements of processing operations.

It should again be emphasized that the embodiments of the invention as described herein are intended to be illustrative only. Other embodiments of the invention can be implemented utilizing a wide variety of different types and arrangements of content delivery systems, networks, client devices, client consoles, user equipment, processing modules, interfaces and other components than those utilized in the particular embodiments described herein. In addition, the particular assumptions made herein in the context of describing certain embodiments need not apply in other embodiments. These and numerous other alternative embodiments will be readily apparent to those skilled in the art.

What is claimed is:

1. A method comprising steps of:

receiving content from a plurality of sources;

generating positional information for the sources wherein the positional information indicates for each of the sources its current position in a set of possible positions relative to other ones of the sources;

generating multiple content streams comprising respective portions of the content received from respective ones of the sources based at least in part on the positional information and a mapping between the content streams and the sources;

transmitting the content streams with their associated positional information over a network;

detecting a change in position of at least a given one of the sources relative to other ones of the sources;

responsive to the change in position of the given source, altering the mapping between the multiple content streams and the sources; and repeating at least a subset of the steps utilizing the altered mapping;

wherein altering the mapping between the multiple content streams and the sources comprises changing the mapping of the given source from a mapping of the given source to a first one of the content streams to a mapping of the given source to a second one of the content streams different than the first content stream responsive to the change in position of the given source;

wherein generating the content streams comprises generating the content streams in a manner that permits a client device to provide a user with a dynamic vantage point within a live event by automatically switching between the content streams without requiring the user to select any particular ones of the content streams;

wherein the dynamic vantage point is determined at least in part as a function of velocity information received from user equipment operated by the user; and wherein the steps are implemented in at least one processing device comprising a processor coupled to a memory.

2. The method of claim 1 wherein transmitting the content streams with their associated positional information comprises transmitting the positional information for a given one of the content streams and the positional information of at least one additional one of the content streams as metadata for the given content stream.

3. The method of claim 1 wherein at least a subset of the plurality of sources each comprise a participant-mounted wireless video camera having location determination functionality that is utilized in generating a corresponding portion of the positional information.

4. The method of claim 1 wherein at least a subset of the plurality of sources comprise respective live video sources associated with respective actual participants in a live event.

5. The method of claim 4 wherein the live event comprises a race and the actual participants comprise actual participants in the race.

6. The method of claim 5 wherein the positional information indicates current positions of the actual participants in the race.

7. The method of claim 5 wherein the positional information comprises respective distinct sequence numbers corresponding to respective ones of a plurality of possible positions of the actual participants in the race.

8. The method of claim 1 wherein the user equipment comprises exercise equipment and the velocity information received from the user equipment comprises a velocity indicator generated as the user operates the exercise equipment.

9. The method of claim 1 wherein generating the multiple content streams comprises:

encoding the portions of the received content in respective ones of a plurality of encoders; and segmenting the encoded portions into respective streams of video segments.

10. The method of claim 9 wherein transmitting the content streams with their associated positional information over a network comprises transmitting the streams of video segments to a plurality of distributed web servers over the Internet.

11. An article of manufacture comprising a computer-readable storage medium having computer program code embodied therein, wherein the computer program code when executed in at least one processing device comprising a processor coupled to a memory causes said at least one processing device:

to receive content from a plurality of sources;

to generate positional information for the sources wherein the positional information indicates for each of the sources its current position in a set of possible positions relative to other ones of the sources;

to generate multiple content streams comprising respective portions of the content received from respective ones of the sources based at least in part on the positional information and a mapping between the content streams and the sources;

to transmit the content streams with their associated positional information over a network;

to detect a change in position of at least a given one of the sources relative to other ones of the sources;

responsive to the change in position of the given source, to alter the mapping between the multiple content streams and the sources; and to repeat at least a subset of the steps utilizing the altered mapping;

wherein altering the mapping between the multiple content streams and the sources comprises changing the mapping of the given source from a mapping of the given source to a first one of the content streams to a mapping of the given source to a second one of the content streams different than the first content stream responsive to the change in position of the given source;

wherein generating the content streams comprises generating the content streams in a manner that permits a client device to provide a user with a dynamic vantage point within a live event by automatically switching between the content streams without requiring the user to select any particular ones of the content streams; and wherein the dynamic vantage point is determined at least in part as a function of velocity information received from user equipment operated by the user.

12. An apparatus comprising:

at least one processing device comprising a processor coupled to a memory;

said at least one processing device being configured:

to receive content from a plurality of sources;

to generate positional information for the sources wherein the positional information indicates for each of the sources its current position in a set of possible positions relative to other ones of the sources;

to generate multiple content streams comprising respective portions of the content received from respective ones of the sources based at least in part on the positional information and a mapping between the content streams and the sources; and to transmit the content streams with their associated positional information over a network;

wherein responsive to detection of a change in position of at least a given one of the sources relative to other ones of the sources, the mapping between the multiple content streams and the sources is altered and at least a subset of the receiving content, generating positional information, generating multiple content streams and transmitting the content streams are repeated utilizing the altered mapping;

wherein altering the mapping between the multiple content streams and the sources comprises changing the mapping of the given source from a mapping of the given source to a first one of the content streams to a mapping of the given source to a second one of the content streams different than the first content stream responsive to the change in position of the given source;

wherein generating the content streams comprises generating the content streams in a manner that permits a client device to provide a user with a dynamic vantage point within a live event by automatically switching between the content streams without requiring the user to select any particular ones of the content streams; and wherein the dynamic vantage point is determined at least in part as a function of velocity information received from user equipment operated by the user.

13. The apparatus of claim 12 wherein said at least one processing device comprises:

a media control center; and a video server coupled to the media control center.

14. A content delivery system comprising the apparatus of claim 13.

15. A method comprising steps of:

obtaining information characterizing multiple content streams comprising respective portions of content received from respective ones of a plurality of sources;

obtaining positional information for the sources wherein the positional information indicates for each of the sources its current position in a set of possible positions relative to other ones of the sources;

generating an additional content stream comprising selected portions of particular ones of the multiple content streams based at least in part on the positional information and a mapping between the content streams and the sources; and presenting the additional content stream to a user;

wherein the additional content stream is generated by applying one or more video processing operations to alter one or more of the selected portions such that video content of the additional content stream automatically varies in accordance with a virtual position of the user amongst the sources; and wherein the steps are implemented in at least one processing device comprising a processor coupled to a memory.

16. The method of claim 15 wherein generating the additional content stream comprises generating an audio portion of the additional content stream utilizing a combination of audio portions from two or more of the content streams.

17. The method of claim 15 wherein the steps are applied separately to a set of video streams and a set of audio streams.

18. A method comprising steps of:

obtaining information characterizing multiple content streams comprising respective portions of content received from respective ones of a plurality of sources;

obtaining positional information for the sources wherein the positional information indicates for each of the sources its current position in a set of possible positions relative to other ones of the sources;

generating an additional content stream comprising selected portions of particular ones of the multiple content streams based at least in part on the positional information and a mapping between the content streams and the sources; and presenting the additional content stream to a user;

wherein generating the additional content stream comprises generating the additional content stream so as to provide the user with a dynamic vantage point within a live event by automatically switching between the selected portions of the particular ones of the multiple content streams without requiring the user to select any particular ones of the multiple content streams;

wherein the dynamic vantage point is determined at least in part as a function of velocity information received from user equipment operated by the user; and wherein the steps are implemented in at least one processing device comprising a processor coupled to a memory.

19. The method of claim 18 wherein the user equipment comprises exercise equipment and the velocity information received from the user equipment comprises a velocity indicator generated as the user operates the exercise equipment.

20. An article of manufacture comprising a computer-readable storage medium having computer program code embodied therein, wherein the computer program code when executed in at least one processing device comprising a processor coupled to a memory causes said at least one processing device:

to obtain information characterizing multiple content streams comprising respective portions of content received from respective ones of a plurality of sources;

to obtain positional information for the sources wherein the positional information indicates for each of the sources its current position in a set of possible positions relative to other ones of the sources;

to generate an additional content stream comprising selected portions of particular ones of the multiple content streams based at least in part on the positional information and a mapping between the content streams and the sources; and to present the additional content stream to a user;

wherein the additional content stream is generated by applying one or more video processing operations to alter one or more of the selected portions such that video content of the additional content stream automatically varies in accordance with a virtual position of the user amongst the sources.

21. An apparatus comprising:

at least one processing device comprising a processor coupled to a memory;

wherein said at least one processing device is configured:

to obtain information characterizing multiple content streams comprising respective portions of content received from respective ones of a plurality of sources;

to obtain positional information for the sources wherein the positional information indicates for each of the sources its current position in a set of possible positions relative to other ones of the sources;

to generate an additional content stream comprising selected portions of particular ones of the multiple content streams based at least in part on the positional information and a mapping between the content streams and the sources; and to present the additional content stream to a user;

wherein the additional content stream is generated by applying one or more video processing operations to alter one or more of the selected portions such that video content of the additional content stream automatically varies in accordance with a virtual position of the user amongst the sources.

22. The apparatus of claim 21 wherein said at least one processing device comprises a client device.

23. The apparatus of claim 21 wherein at least a subset of the plurality of sources comprise respective live video sources associated with respective actual participants in a live event.

24. The apparatus of claim 23 wherein the live event comprises a race and the actual participants comprise actual participants in the race.

25. The apparatus of claim 24 wherein the positional information indicates current positions of the actual participants in the race.

* * * * *